(12) United States Patent
Koorapaty et al.

(10) Patent No.: US 12,464,550 B2
(45) Date of Patent: Nov. 4, 2025

(54) FRACTIONAL REUSE OF RESOURCES WITH FLEXIBLE ENERGY DETECTION IN UNLICENSED SPECTRUM

(71) Applicant: Telefonaktiebolaget LM Ericsson (publ), Stockholm (SE)

(72) Inventors: Havish Koorapaty, Saratoga, CA (US); Jung-Fu Cheng, Fremont, CA (US); Iana Siomina, Täby (SE); Esther Sienkiewicz, Ottawa (CA); Muhammad Kazmi, Sundbyberg (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 466 days.

(21) Appl. No.: 17/639,059

(22) PCT Filed: Aug. 26, 2020

(86) PCT No.: PCT/SE2020/050821
§ 371 (c)(1),
(2) Date: Feb. 28, 2022

(87) PCT Pub. No.: WO2021/040607
PCT Pub. Date: Mar. 4, 2021

(65) Prior Publication Data
US 2022/0303996 A1    Sep. 22, 2022

Related U.S. Application Data

(60) Provisional application No. 62/892,342, filed on Aug. 27, 2019.

(51) Int. Cl.
*H04W 72/541* (2023.01)
*H04W 56/00* (2009.01)
(Continued)

(52) U.S. Cl.
CPC ....... *H04W 72/541* (2023.01); *H04W 56/001* (2013.01); *H04W 72/0446* (2013.01); *H04W 72/0453* (2013.01)

(58) Field of Classification Search
None
See application file for complete search history.

(56) References Cited

U.S. PATENT DOCUMENTS

2016/0330780 A1* 11/2016 Kim ................. H04W 76/14
2017/0034670 A1*  2/2017 Zhang ............... H04W 74/08
(Continued)

FOREIGN PATENT DOCUMENTS

WO    2016039599 A1    3/2016

OTHER PUBLICATIONS

Huawei, Hisilicon; 3GPP TSG RAN WG1 83 Meeting; R1-156437; "Agenda Item: 6.2.3.1: Adaptation rules of energy detection threshold"; Anaheim, USA; Nov. 15-22, 2015; 3 pages.
(Continued)

*Primary Examiner* — Intekhaab A Siddiquee
(74) *Attorney, Agent, or Firm* — Sage Patent Group

(57) ABSTRACT

A method, network node and wireless device for fractional reuse of resources with flexible energy detection in unlicensed spectrum are disclosed. According to one aspect, a method in a network node includes associating each of a plurality of sets of resources within a cell with a different energy detection (ED) threshold, the resources in each set of the plurality of sets of resources being at least one of time resources and frequency resources. The method also includes assigning each set of resources of the plurality of sets of resources to a different set of a plurality of sets of wireless devices (WDs).

18 Claims, 12 Drawing Sheets

(51) Int. Cl.
*H04W 72/0446* (2023.01)
*H04W 72/0453* (2023.01)

(56) References Cited

U.S. PATENT DOCUMENTS

| | | |
|---|---|---|
| 2017/0230944 A1 | 8/2017 | Babaei et al. |
| 2017/0273109 A1 | 9/2017 | Babaei et al. |
| 2018/0352577 A1 | 12/2018 | Zhang et al. |

OTHER PUBLICATIONS

International Search Report and Written Opinion mailed Jan. 15, 2021 for PCT International Application No. PCTSE2020050821, 12 pages.
International Preliminary Report on Patentability mailed Mar. 1, 2022 for PCT International Application No. PCTSE2020050821, 8 pages.

\* cited by examiner

F1/T1, EDT = Y (e.g. -72 dBm)
F2/T2, EDT = Y (e.g. -72 dBm)
F3/T3, EDT = Y (e.g. -72 dBm)
F4/T4, EDT = Y (e.g. -62 dBm)

FRACTIONAL REUSE OF RESOURCES WITH FLEXIBLE ENERGY DETECTION IN UNLICENSED SPECTRUM

CROSS-REFERENCE TO RELATED APPLICATIONS

This application is a Submission Under 35 U.S.C. § 371 for U.S. National Stage Patent Application of International Application No.: PCT/SE2020/050821, filed Aug. 26, 2020 entitled "FRACTIONAL REUSE OF RESOURCES WITH FLEXIBLE ENERGY DETECTION IN UNLICENSED SPECTRUM," which claims priority to U.S. Provisional Application No. 62/892,342, filed Aug. 27, 2019, entitled "FRACTIONAL REUSE OF RESOURCES WITH FLEXIBLE ENERGY DETECTION IN UNLICENSED SPECTRUM," the entireties of both of which are incorporated herein by reference.

FIELD

The present disclosure relates to wireless communications, and in particular, to fractional reuse of resources with flexible energy detection in unlicensed spectrum.

BACKGROUND

Networks Operating in Unlicensed Spectrum

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. In addition to LTE and NR operating at frequencies in a licensed frequency spectrum, other radio standards such as Wi-Fi operate in an unlicensed frequency spectrum. The 3GPP also develops standards for interoperability of LTE, NR and Wi-Fi.

Thus, frequency spectra available for wireless communications are divided into licensed spectra and unlicensed spectra. Unlike with the licensed spectrum, a carrier in an unlicensed spectrum may be simultaneously used by multiple networks each with multiple devices operating within the network. Therefore, some sharing mechanisms are necessary to share the carrier. This is typically achieved using a listen-before-talk (LBT) mechanism. A device performing LBT senses the channel (clear channel assessment or CCA) and processes the sensing results according to an LBT protocol to assess whether the channel is free or busy. If the channel is found to be free as per the protocol, the device then transmits on the carrier.

The LBT protocol typically involves a wireless device (WD) sensing the carrier in one or more sensing intervals. The channel is assessed to be busy or idle within each of these sensing intervals. Sensing the medium to be idle can be done in different ways, e.g., using energy detection, preamble detection or using virtual carrier sensing. Energy detection implies that the node listens to the channel and measures the received energy within the sensing interval. The received energy reflects all sources of interference and noise received on the carrier within the sensing interval. If this received energy is lower than a certain threshold (often called the Energy Detection (ED) threshold), the WD declares that the medium is idle. Otherwise, declares that the medium is busy (or occupied).

Sensing as described above is typically done for a random number of sensing intervals with this random number being a number within the range of 0 to CW, where CW represents a contention window size. Initially, a back off counter is initialized to this random number drawn within 0 and CW. When a busy carrier is sensed to have become idle, a device must wait for a fixed period, after which it can sense the carrier in units of the sensing interval. For each sensing interval within which the carrier is sensed to be idle, the back off counter is decremented. When the back off counter reaches zero, the device can transmit on the carrier. After transmission, if a collision is detected via the reception of a negative acknowledgement or by some other means, the contention window size, CW, is doubled.

Upon gaining access to the channel using an LBT procedure, the device is allowed to transmit with the transmission being referred to as a channel occupancy. There are typically limits placed on the duration of a channel occupancy referred to as the maximum channel occupancy time (MCOT) which depends on the lowest priority class traffic being carried by the transmission.

Fractional Frequency Reuse

Any cellular network with multiple nodes in the network, each node forming a "cell" within which users are served, must employ reuse of time, frequency and spatial resources in order to be able to provide sufficient capacity for a large number of users. Frequency reuse refers to the use of the same frequency resources at the same time by multiple nodes. The frequency resources could be different carrier frequencies or different frequency resources within a single carrier frequency, e.g., different sub-carriers or resource blocks on a single carrier frequency in a system employing orthogonal frequency division multiplexed (OFDM) transmission. FIG. 1 shows a diagram of different cells with a frequency reuse of 3

Most cellular networks today operate with reuse 1, i.e., all frequencies are available for use in all cells. However, a technique called fractional frequency reuse (FFR) has been shown to provide some system performance benefits. In such a scheme, some regions of every cell use the same frequency resources while other regions of adjacent cells may use different frequency resources. Such a scheme is shown in FIG. 2 where the devices close to the base station (referred to as an eNB for LTE networks, as a gNB for NR, and as an access point (AP) for Wi-Fi networks) at the center of each cell may use the same frequency resources (represented in black) while the devices that are closer to the cell edge in adjacent cells may use different frequencies.

A fractional frequency reuse scheme allows different reuse factors to be applied to different parts of the cell. In the interior of the cell where a mobile device is close to the serving base station, the signal to interference and noise ratio (SINR) for the link is expected to be high. Transmissions on this link can withstand interference from neighboring cells. At the cell edge where a mobile device is further away from a base station, the SINR for the link is lower. These links are less immune to interference from adjacent cells and performance may be improved by employing some frequency reuse for these links to reduce interference.

In an unlicensed spectrum, existing solutions for setting the energy detection (ED) threshold for users include both fixed settings as well as threshold adaptation. Fixed settings can be done for all cells, groups of cells or for all users of a cell. Threshold adaptation based on criteria such as SINR, buffer occupancy, throughput, etc., have also been considered. Such mechanisms can be per cell or per user.

In general, a problem with the existing approaches is that the combination of ED threshold adaptation jointly with resource allocation mechanisms have not been adequately considered, which results in lower system performance than is desirable.

SUMMARY

Some embodiments advantageously provide methods, network nodes and wireless devices for fractional reuse of resources with flexible energy detection in unlicensed spectrum.

Some embodiments employ joint selection and optimization of the energy detection threshold used by a device prior to a transmission in unlicensed spectrum and resource allocation mechanisms.

Some embodiments include the use of frequency and/or time reuse in unlicensed spectrum with different energy detection thresholds for the different frequency and/or time resource allocations. Frequency resources could be resource blocks or sub-carriers or subbands or bandwidth parts (BWPs) within a single carrier in an OFDM system or different carrier frequencies. Time resources could be slots or symbols within a slot. In one example, a first set of frequency and/or time resources subject to clear channel assessment (CCA) is associated with a first energy detection (ED) configuration and a second set of frequency and/or time resources subject to CCA is associated with a second ED configuration. In another example, there are more than two (e.g., N=3, 4, . . . ) such non-overlapping sets of resources, each associated with an ED configuration. A combination of time and frequency resources in some examples may further comprise a frequency hopping configuration. In another example, time and/or frequency resources may be characterized by (possible) presence of certain signals/channels, e.g., a first set of time and/or frequency resources which may comprise synchronization signal blocks (SSBs) and a second set of resources which may not comprise SSBs.

In a further example, at least one of the sets may be configured as a pattern, e.g., a binary string indicative of the corresponding set of the resources; the pattern may be periodic and repeat with a certain periodicity (e.g., 1 slot, 1 subframe, 1 radio frame, K subframes or K ms, etc.). In yet another example, the sets are complementary to each other and all together may comprise all resources in frequency and/or time (e.g., within a time interval or time period or a certain timeline) in the system.

The assignment of users to particular frequency and/or time resources with ED thresholds specific to those resources may be based on one or more of various criteria including Pathloss measurements;
Link quality measurements (e.g., SINR, SNR, reference signal received quality (RSRQ), etc.) or power-based measurements (e.g., reference signal received power (RSRP));
Timing measurements (e.g., round trip time or RTT, base station receive-transmit (Rx-Tx) timing, wireless device (WD) Rx-Tx timing, time of arrival or ToA, Timing Advance or TA measurement, etc.)
Received signal strength indicator (RSSI) and channel occupancy measurements at one or more devices, e.g., resources typically characterized by higher RSSI and/or channel occupancy may be further associated with a higher ED threshold;
The rates of failed transmissions measured, for example, by the rate at which negative acknowledgements or NACKs occur; and
The use of the resources by other uncoordinated networks using the same or different technologies.

Some embodiments allow better optimization of reuse within a wireless network operating in unlicensed spectrum while controlling the interference to neighboring devices as compared with existing solutions.

According to one aspect, a network node comprising processing circuitry is configured to associate each of a plurality of sets of resources within a cell with a different energy detection, ED, threshold, the resources in each set of the plurality of sets of resources being at least one of time resources and frequency resources. The processing circuitry is further configured to assign each set of resources of the plurality of sets of resources to a different set of a plurality of sets of wireless devices, WDs.

According to this aspect, in some embodiments, a first ED threshold is associated with a first set of resources of the plurality of sets of resources assigned to a first set of WDs having first signal to interference plus noise ratios, SINRs, higher than a first threshold, and a second ED threshold is associated with a second set of resources of the plurality of sets of resources assigned to a second set of WDs having second SINR lower than a second threshold. In some embodiments, a first ED threshold is associated with a first set of resources of the plurality of sets of resources assigned to a first set of WDs being less than a first distance from the network node, and a second ED threshold is associated with a second set of resources of the plurality of sets of resources assigned to a second set of WDs being greater than a second distance from the network node. In some embodiments, the first set of resources of the plurality of sets of resources is reused in adjacent cells and assigned to WDs based on distance to a network node serving an adjacent cell, and the second set of resources of the plurality of sets of resources are not reused in adjacent cells. In some embodiments, the first and second set of resources of the plurality of sets of resources are frequency resources within a carrier. In some embodiments, each of a plurality of ED thresholds is associated with a beam in a cluster of beams serving a sector of a cell. In some embodiments, each set of resources of the plurality of sets of resources associated with an ED threshold are a set of time resources assigned to a different set of WDs and each different set of WDs uses a same set of frequency resources. In some embodiments, an ED threshold associated with a set of resources of the plurality of sets of resources is based on whether resources are shared with a radio access technology different from a radio access technology of the network node. In some embodiments, an ED threshold for a set of resources of the plurality of sets of resources is based at least in part on a synchronization signal block, SSB, configuration across the set of resources. In some embodiments, a gradation of ED thresholds are associated with sets of WDs based on a gradation of WD positions.

According to another aspect, a method in a network node is provided. The method includes associating each of a plurality of sets of resources within a cell with a different energy detection, ED, threshold, the resources in each set of the plurality of sets of resources being at least one of time resources and frequency resources. The method also includes assigning each set of resources of the plurality of sets of resources to a different set of a plurality of sets of wireless devices, WDs.

According to this aspect, in some embodiments, a first ED threshold is associated with a first set of resources of the plurality of sets of resources assigned to a first set of WDs having first signal to interference plus noise ratios, SINRs, higher than a first threshold, and a second ED threshold is associated with a second set of resources of the plurality of sets of resources assigned to a second set of WDs having second SINR lower than a second threshold. In some embodiments, a first ED threshold is associated with a first set of resources of the plurality of sets of resources assigned to a first set of WDs being less than a first distance from the network node, and a second ED threshold is associated with a second set of resources of the plurality of sets of resources assigned to a second set of WDs being greater than a second distance from the network node. In some embodiments, the first set of resources of the plurality of sets of resources are reused in adjacent cells and assigned to WDs based on distance to a network node serving an adjacent cell, and the second set of resources of the plurality of sets of resources are not reused in adjacent cells. In some embodiments, the first and second set of resources of the plurality of sets of resources are frequency resources within a carrier. In some embodiments, each of a plurality of ED thresholds is associated with a beam in a cluster of beams serving a sector of a cell. In some embodiments, each set of resources of the plurality of sets of resources associated with an ED threshold are a set of time resources assigned to a different set of WDs and each different set of WDs uses a same set of frequency resources. In some embodiments, an ED threshold associated with a set of resources of the plurality of sets of resources is based on whether resources are shared with a radio access technology different from a radio access technology of the network node. In some embodiments, an ED threshold for a set of resources of the plurality of sets of resources is based at least in part on a synchronization signal block, SSB, configuration across the set of resources. In some embodiments, a gradation of ED thresholds are associated with sets of WDs based on a gradation of WD positions.

According to yet another aspect, a WD includes processing circuitry configured to associate each of a plurality of sets of resources with a different energy detection, ED, threshold, the resources in each set of the plurality of sets of resources being at least one of time resources and frequency resources.

According to this aspect, in some embodiments, a first ED threshold is associated with a first set of resources of the plurality of sets of resources assigned to a first set of WDs having first signal to interference plus noise ratios, SINRs, higher than a first threshold, and a second ED threshold is associated with a second set of resources of the plurality of sets of resources assigned to a second set of WDs having second SINR lower than a second threshold. In some embodiments, a first ED threshold is associated with a first set of resources of the plurality of sets of resources assigned to a first set of WDs being less than a first distance from a network node, and a second ED threshold is associated with a second set of resources of the plurality of sets of resources assigned to a second set of WDs being greater than a second distance from the network node. In some embodiments, the first set of resources of the plurality of sets of resources is reused in adjacent cells and assigned to WDs based on distance to a network node serving an adjacent cell, and the second set of resources of the plurality of sets of resources are not reused in adjacent cells. In some embodiments, the first and second set of resources of the plurality of sets of resources are frequency resources within a carrier. In some embodiments, each of a plurality of ED thresholds is associated with a beam in a cluster of beams serving a sector of a cell. In some embodiments, each set of resources of the plurality of sets of resources associated with an ED threshold are a set of time resources assigned to a different set of WDs and each different set of WDs uses a same set of frequency resources. In some embodiments, an ED threshold associated with a set of resources of the plurality of sets of resources is based on whether resources are shared with a radio access technology different from a radio access technology of a network node. In some embodiments, an ED threshold for a set of resources of the plurality of sets of resources is based at least in part on a synchronization signal block, SSB, configuration across the set of resources. In some embodiments, a gradation of ED thresholds are associated with sets of WDs based on a gradation of WD positions.

According to yet another aspect, a method implemented in a WD is provided. The method includes associating each of a plurality of sets of resources within a cell with a different energy detection, ED, threshold, the resources in each set of the plurality of sets of resources being at least one of time resources and frequency resources.

According to this aspect, in some embodiments, a first ED threshold is associated with a first set of resources of the plurality of sets of resources assigned to a first set of WDs having first signal to interference plus noise ratios, SINRs, higher than a first threshold, and a second ED threshold is associated with a second set of resources of the plurality of sets of resources assigned to a second set of WDs having second SINR lower than a second threshold. In some embodiments, a first ED threshold is associated with a first set of resources of the plurality of sets of resources assigned to a first set of WDs being less than a first distance from a network node, and a second ED threshold is associated with a second set of resources of the plurality of sets of resources assigned to a second set of WDs being greater than a second distance from the network node. In some embodiments, the first set of resources of the plurality of sets of resources is reused in adjacent cells and assigned to WDs based on distance to a network node serving an adjacent cell, and the second set of resources of the plurality of sets of resources are not reused in adjacent cells. In some embodiments, the first and second set of resources of the plurality of sets of resources are frequency resources within a carrier. In some embodiments, each of a plurality of ED thresholds is associated with a beam in a cluster of beams serving a sector of a cell. In some embodiments, each set of resources of the plurality of sets of resources associated with an ED threshold are a set of time resources assigned to a different set of WDs and each different set of WDs uses a same set of frequency resources. In some embodiments, an ED threshold associated with a set of resources of the plurality of sets of resources is based on whether resources are shared with a radio access technology different from a radio access technology of a network node. In some embodiments, an ED threshold for a set of resources of the plurality of sets of resources is based at least in part on a synchronization signal block, SSB, configuration across the set of resources. In some embodiments, a gradation of ED thresholds are associated with sets of WDs based on a gradation of WD positions.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
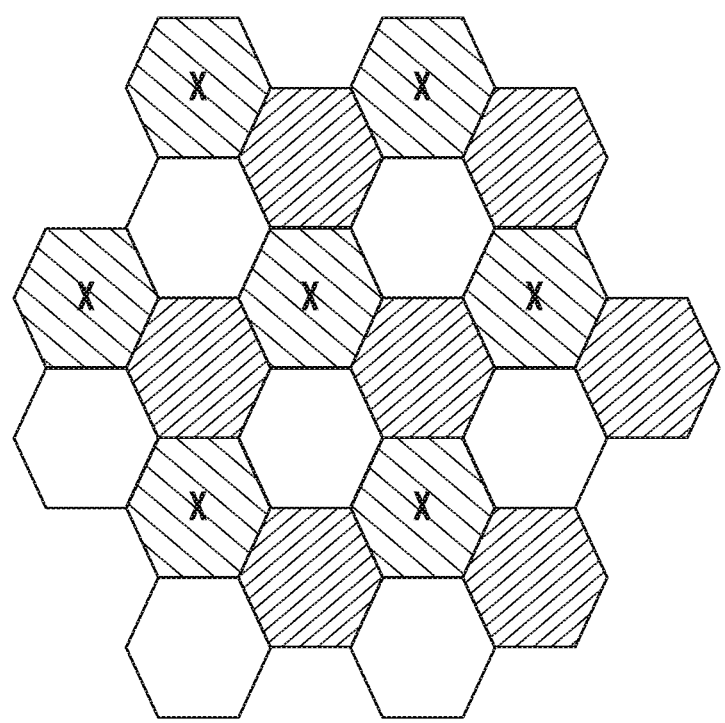
FIG. 1 shows frequency reuse by a plurality of cells.
Figure 2:
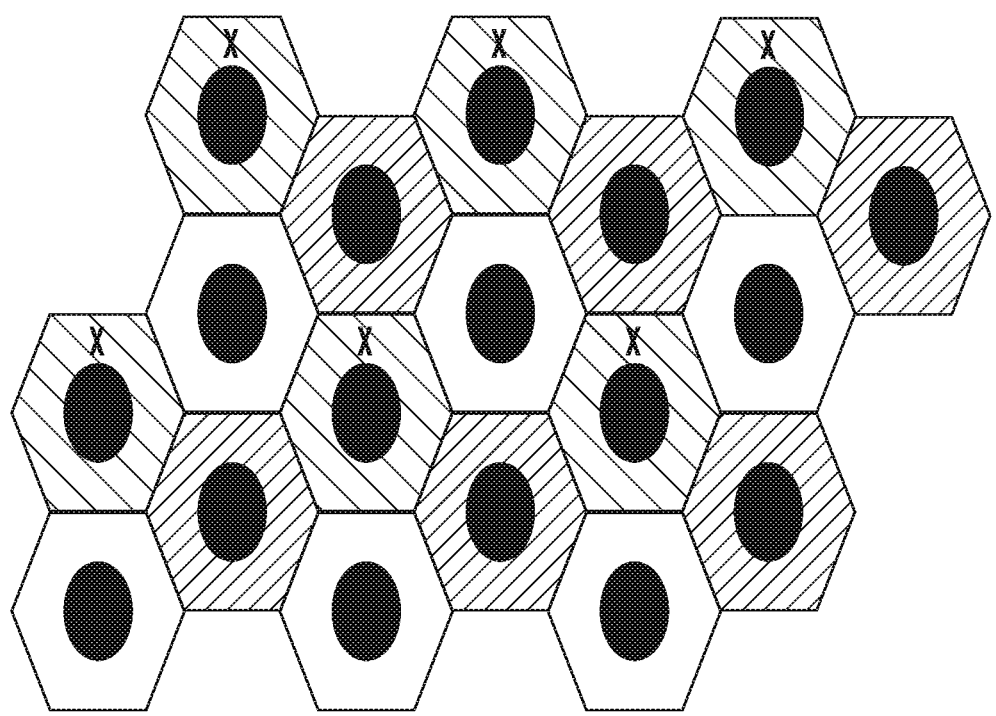
FIG. 2 shows fractional frequency reuse by a plurality of cells.

Before describing in detail exemplary embodiments, it is noted that the embodiments reside primarily in combinations of apparatus components and processing steps related to fractional reuse of resources with flexible energy detection in unlicensed spectrum. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to fractional reuse of resources with flexible energy detection in unlicensed spectrum. According to one aspect, a method in a network node includes associating each of a plurality of sets of time and/or frequency resources with a different energy detection threshold. The method also includes assigning each of a plurality of the sets of time and/or frequency resources to a different user or set of users.

A basic technique for resource allocation is controlling inter-cell interference by assigning different frequency resources specifically to different cells. Flexibility of an ED threshold for all users of a cell has been employed when such frequency reuse mechanisms are in place. Fractional frequency reuse has been known as a method to increase the efficiency of wireless communication networks. However, its use in unlicensed spectrum has not been studied to the same extent.

Figure 3:
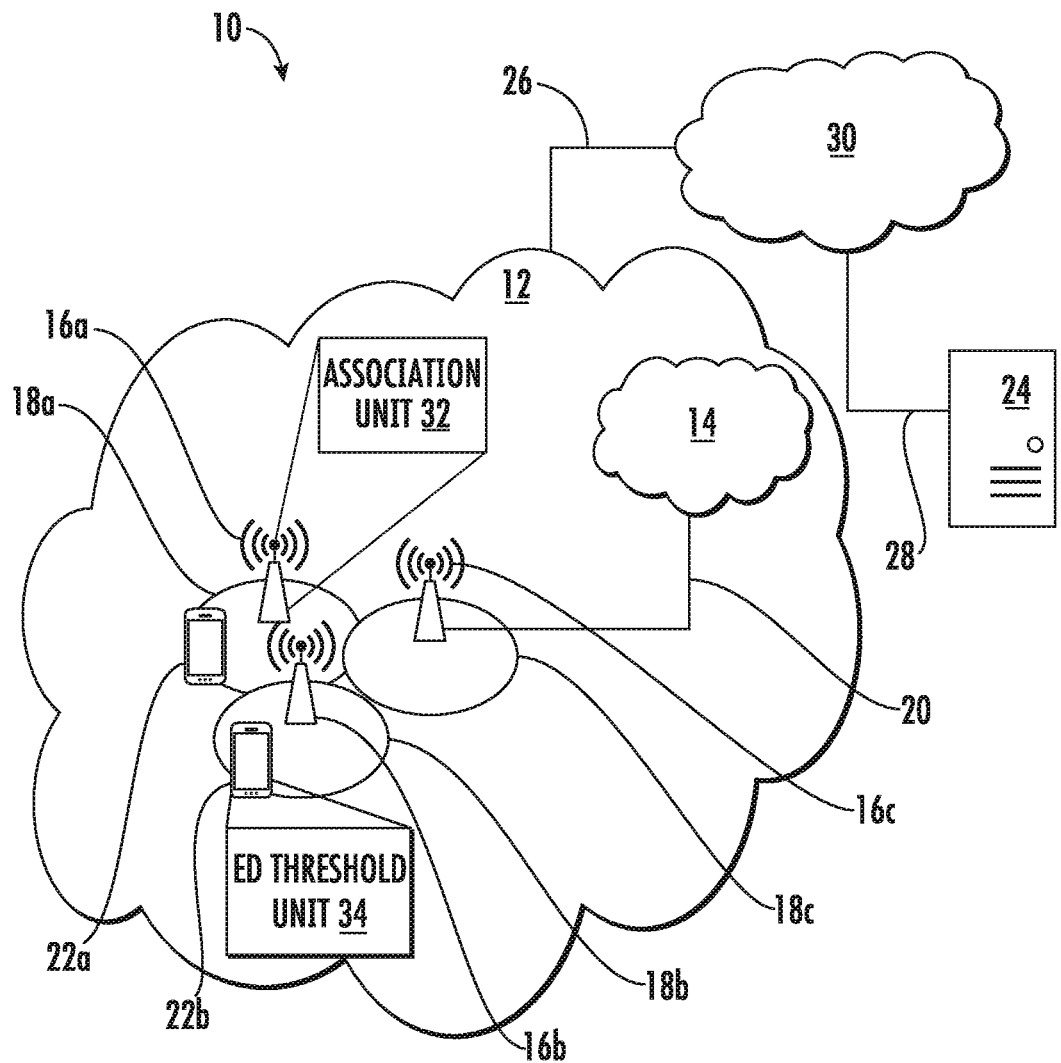
FIG. 3 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an association unit 32 which is configured to associate each of a plurality of sets of time and/or frequency resources with a different energy detection threshold. A wireless device 22 is configured to include an ED threshold unit 34 which is configured to determine an energy detection (ED) threshold to be used for each of plurality of sets of time and/or frequency resources based at least in part on the SSB configuration.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include association unit 32 which is configured to associate each of a plurality of sets of time and/or frequency resources with a different energy detection threshold.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include ED threshold unit 34 which is configured to determine an energy detection (ED) threshold to be used for each of plurality of sets of time and/or frequency resources based at least in part on the SSB configuration.

Figure 4:
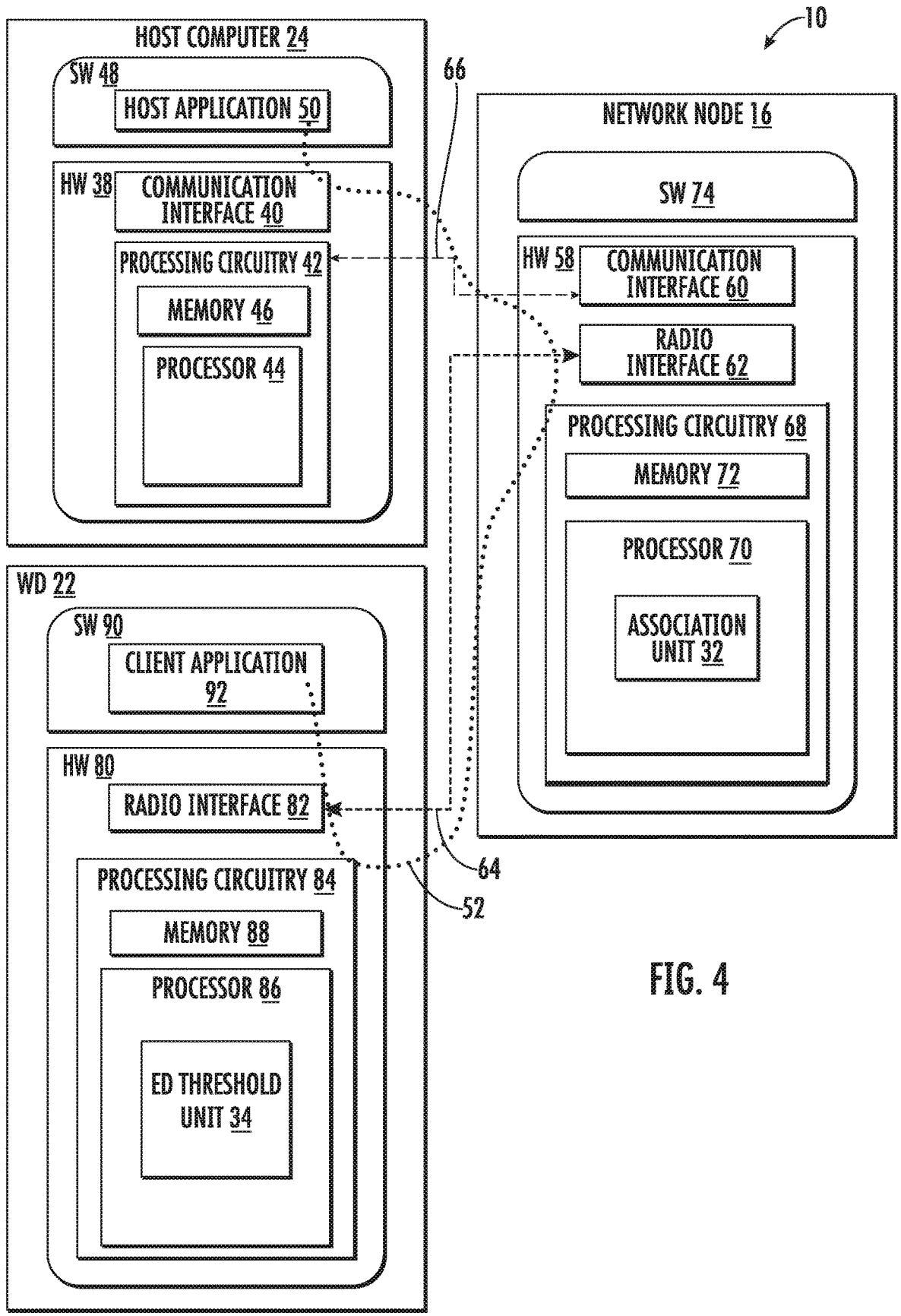
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as association unit 32, and ED threshold unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
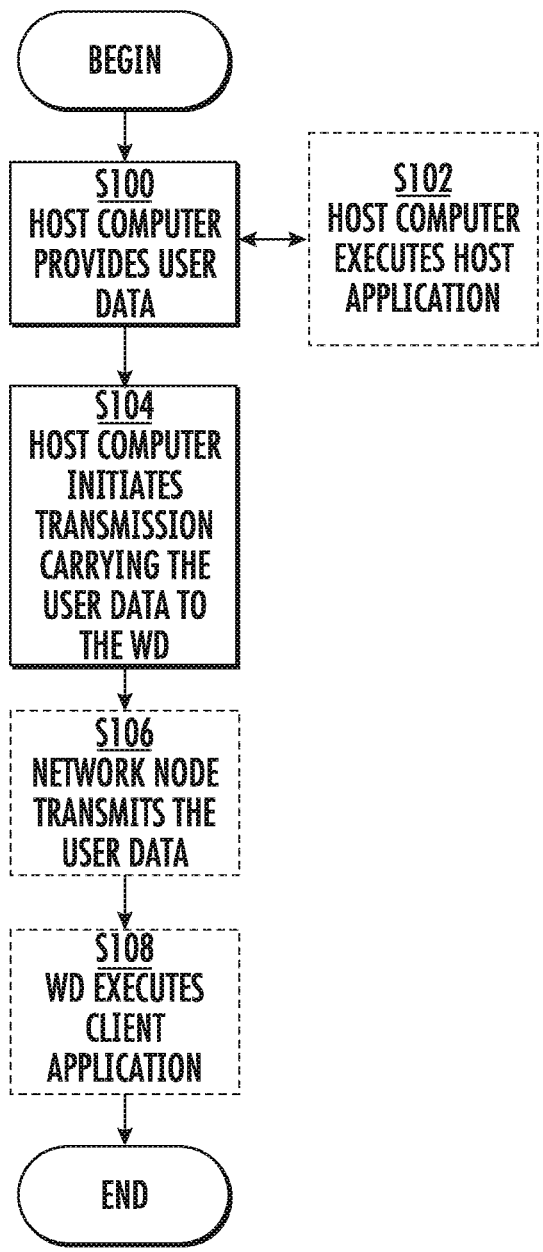
FIG. 5 is a flowchart illustrating exemplary methods implemented in a communication system including a host computer, a network node and a wireless device for executing a client application at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 6:
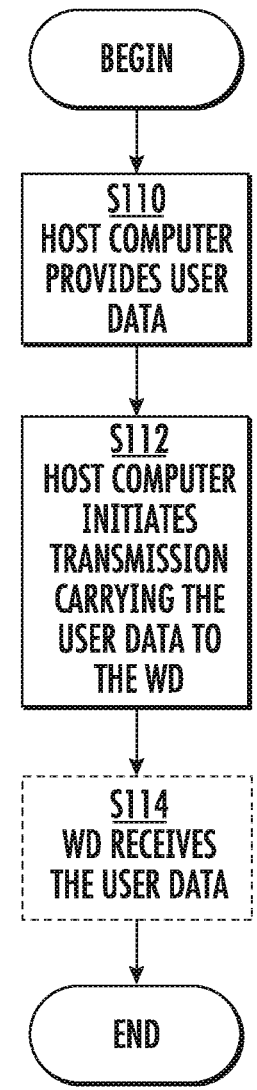
FIG. 6 is a flowchart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 7:
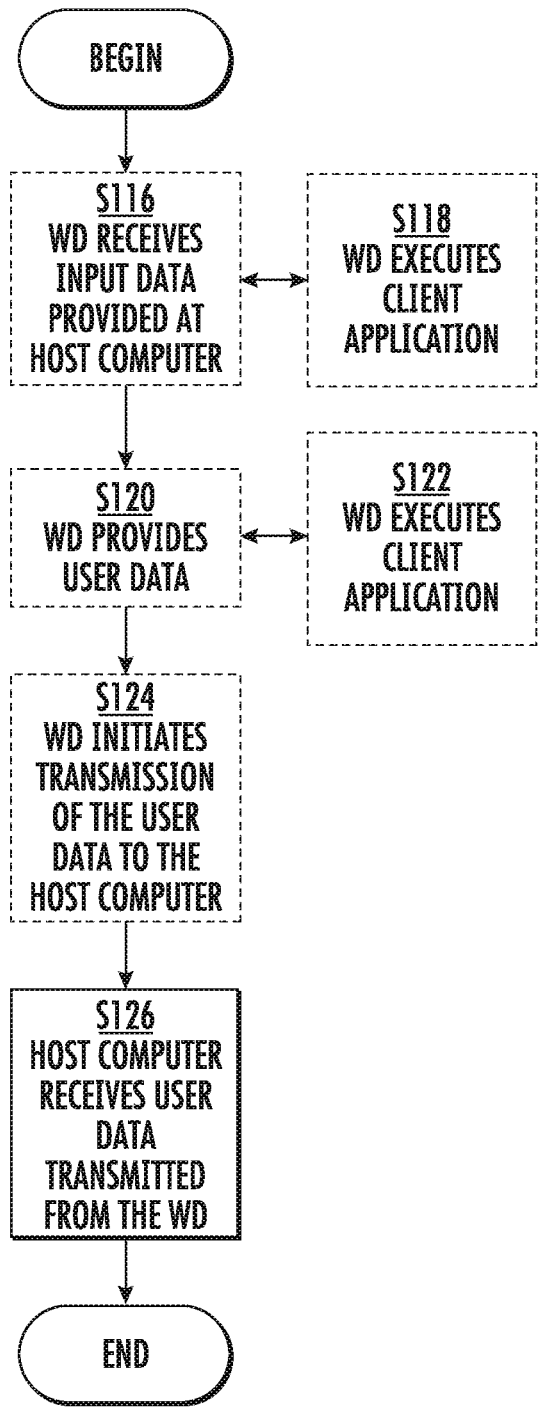
FIG. 7 is a flowchart illustrating exemplary methods implemented in a communication system including a host computer, a network node and a wireless device for receiving user data from the wireless device at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally, or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 8:
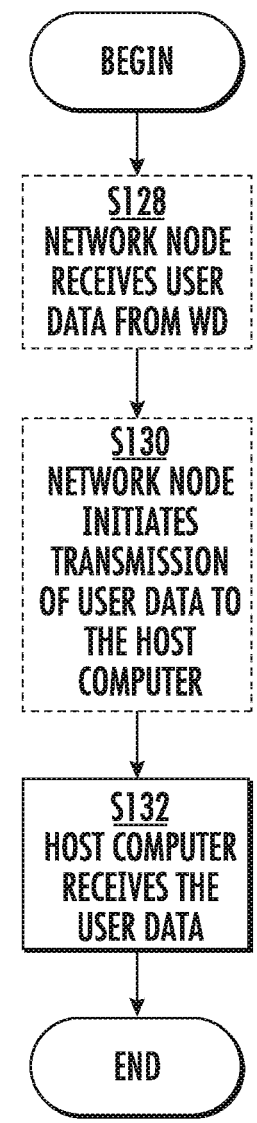
FIG. 8 is a flowchart illustrating exemplary methods implemented in a communication system including a host computer, a network node and a wireless device for receiving user data at a host computer according to some embodiments of the present disclosure.

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130).

In a third step, the host computer 24 receives the user data carried in the transmission initiated by the network node 16 (Block S132).

Figure 9:
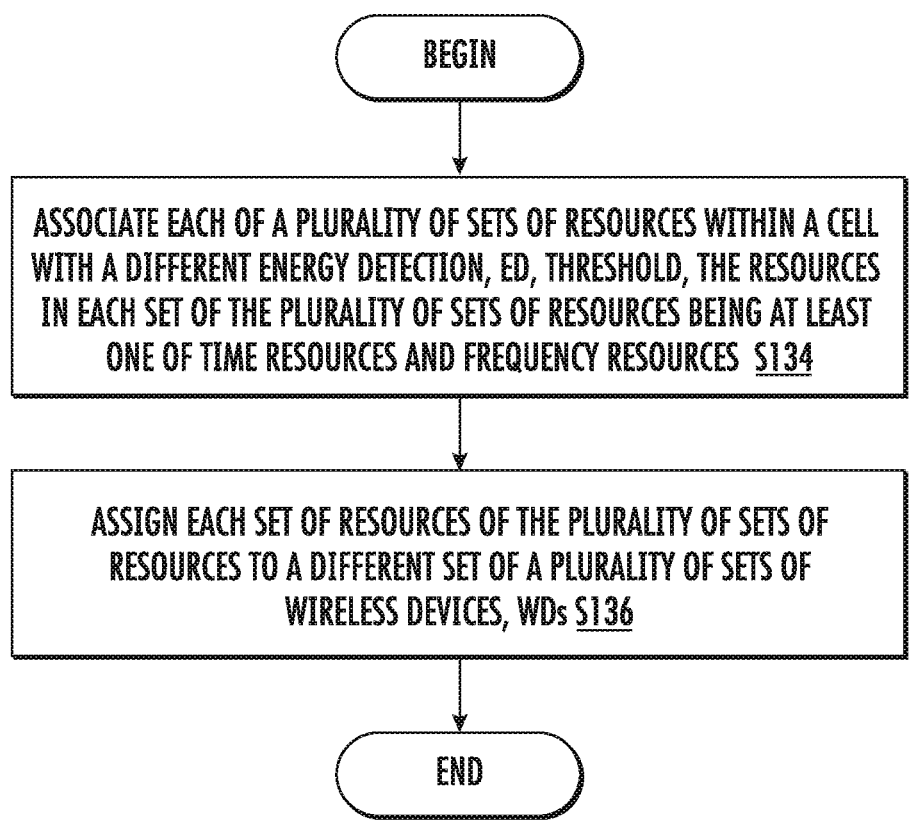
FIG. 9 is a flowchart of an exemplary process in a network node for fractional reuse of resources with flexible energy detection in unlicensed spectrum.

FIG. 9 is a flowchart of an exemplary process in a network node 16 for fractional reuse of resources with flexible energy detection in unlicensed spectrum. One or more blocks described herein may be performed by one or more elements of network node 16 such as by one or more of processing circuitry 68 (including the association unit 32), processor 70, radio interface 62 and/or communication interface 60. Network node 16 such as via processing circuitry 68 and/or processor 70 and/or radio interface 62 and/or communication interface 60 is configured to associate each of a plurality of sets of resources within a cell with a different energy detection, ED, threshold, the resources in each set of the plurality of sets of resources being at least one of time resources and frequency resources (Block S134). The process also includes assigning each set of resources of the plurality of sets of resources to a different set of a plurality of sets of wireless devices, WDs (Block S136).

Figure 10:
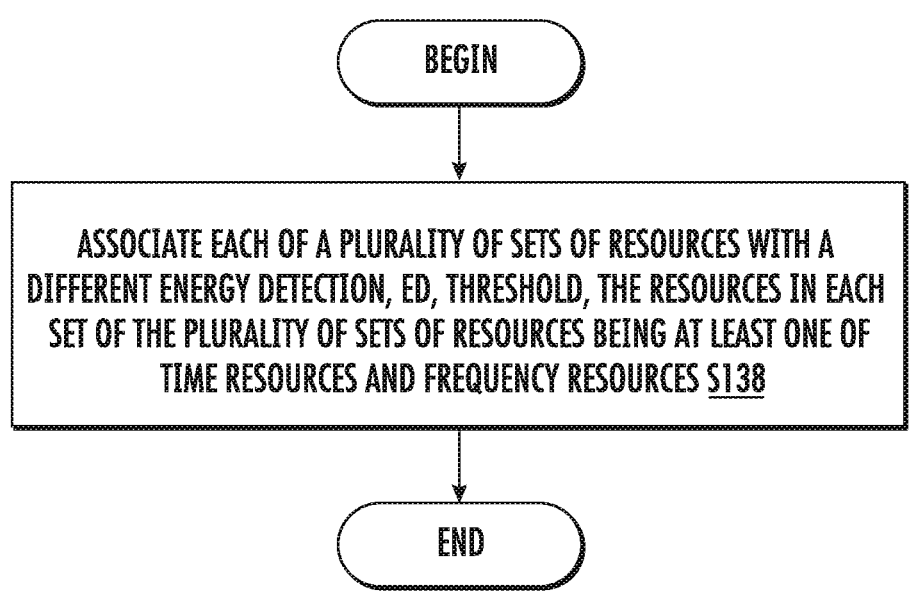
FIG. 10 is a flowchart of an exemplary process in a wireless device for fractional reuse of resources with flexible energy detection in unlicensed spectrum.

FIG. 10 is a flowchart of an exemplary process in a wireless device 22 according to some embodiments of the present disclosure. One or more blocks described herein may be performed by one or more elements of wireless device 22 such as by one or more of processing circuitry 84 (including the ED threshold unit 34), processor 86, radio interface 82 and/or communication interface 60. Wireless device 22 such as via processing circuitry 84 and/or processor 86 and/or radio interface 82 is configured to associate each of a plurality of sets of resources with a different energy detection, ED, threshold, the resources in each set of the plurality of sets of resources being at least one of time resources and frequency resources (Block S138).

Having described the general process flow of arrangements of the disclosure and having provided examples of hardware and software arrangements for implementing the processes and functions of the disclosure, the sections below provide details and examples of arrangements for fractional reuse of resources with flexible energy detection in unlicensed spectrum.

Some embodiments use joint selection and optimization of the energy detection threshold used by a device prior to a transmission in unlicensed spectrum and resource allocation mechanisms. Some embodiments make use of frequency and/or time reuse in unlicensed spectrum with different energy detection thresholds for the different frequency and/or time resource allocations. Frequency resources could be resource blocks or sub-carriers or sub-bands or bandwidth parts (BWPs) within a single carrier in an OFDM system or different carrier frequencies. Time resources could be slots or symbols within a slot. In one example, a first set of frequency and/or time resources subject to CCA may be associated with a first ED configuration and a second set of frequency and/or time resources subject to CCA is associated with a second ED configuration. In another example, there may be more than two (e.g., N=3, 4, . . . ) such non-overlapping sets of resources, each associated with an ED configuration. A combination of time and frequency resources in some examples may further comprise a frequency hopping configuration. In another example, time and/or frequency resources may be characterized by (possible) presence of certain signals or channels, e.g., a first set of time and/or frequency resources which may comprise SSBs and a second set of resources which may not comprise SSBs.

In a further example, at least one of the sets may be configured as a pattern, e.g., a binary string indicative of the corresponding set of the resources; the pattern may be periodic and repeat with a certain periodicity (e.g., 1 slot, 1 subframe, 1 radio frame, K subframes or K ms, etc.). In yet another example, the sets are complementary to each other and all together may comprise all resources in frequency and/or time (e.g., within a time interval or time period or a certain timeline) in the system.

The assignment of users to particular frequency and/or time resources with ED thresholds specific to those resources may be based on one or more of various criteria including:
Pathloss measurements;
Link quality measurements (e.g., SINR, SNR, RSRQ etc.) or power-based measurements (e.g., RSRP);
Timing measurements (e.g., round trip time or RTT, base station Rx-Tx timing,
WD 22 Rx-Tx timing, time of arrival or ToA, Timing Advance or TA measurement, etc.);
RSSI and channel occupancy measurements at one or more devices, e.g., resources typically characterized by higher RSSI and/or channel occupancy may be further associated with a higher ED threshold;
The rates of failed transmissions measured, for example, by the rate at which negative acknowledgements or NACKs occur; and
The use of the resources by other uncoordinated networks using the same or different technologies.

The resource partitioning and ED configuration into sets 1 . . . N may be done for example by:
a network node 16 or supervising device, e.g., base station, self-organizing network (SON), operation and maintenance (O&M), a coordinating or controlling network node 16 or autonomously by a WD 22 or a supervised device (e.g., based on a pre-defined rule, knowledge of SSB configuration, etc.); and/or
jointly by network node 16 and WD 22 (e.g., one or more rules or ED configuration are provided by a network node 16 while the WD 22 is additionally using a pre-defined rule to complete the resource partitioning and association with ED configuration)

The resource partitioning and the ED configuration are then used by the WD 22 and/or radio network nodes 16 for configuring and performing their CCA procedures. Furthermore, the resource partitioning associated with ED configuration may be used by radio network node 16 for adapting their scheduling (e.g., signal/channel transmissions), power control, selecting certain resources for a certain purpose (e.g., only one of the two sets may comprise resources used for positioning, etc.).

Some features are further described in the embodiments below. The features may apply to the downlink and/or the uplink.

Embodiment 1

Figure 11:
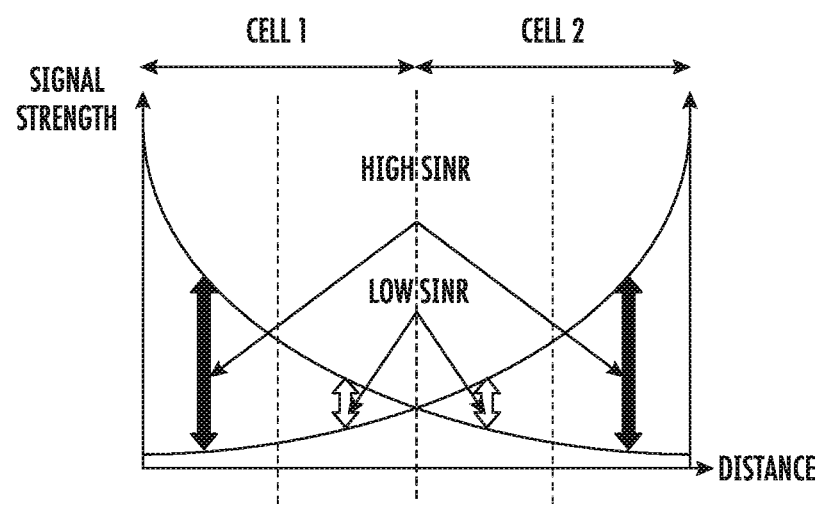
FIG. 11 is a diagram illustrating SINR for different regions of neighboring cells.

The WDs 22 in each cell are grouped into two sets, one for those that have high SINR, which generally correlate to WDs 22 that are closer to the base station relative to interference sources and the second one for those that have low SINR, which generally correlate to WDs 22 that are further away from the base station relative to interference sources, if transmissions were to occur in all cells simultaneously. An example of the partitioning of the cell, e.g., cell 18, into two such regions for downlink transmissions is shown in FIG. 11.

Figure 12:
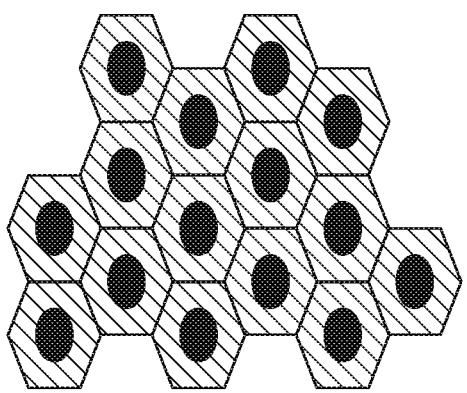
FIG. 12 illustrates fractional reuse among cells using two frequencies and two ED thresholds.

The two sets of WDs 22 are assigned two mutually exclusive sets of carrier frequencies. The energy detection threshold is set independently for each set of carrier frequencies. As an example, the first set representing the higher SINR WDs 22 may use a higher energy detection threshold of −62 dBm and the second set representing the lower SINR WDs 22 may use a lower energy detection threshold of −82 dBm. An example is shown in FIG. 12.

In alternative versions of this embodiment, the grouping of WDs 22 into sets can be based on physical distance from the network node 16 that may be known via timing advance commands issued to the WD 22 or via positioning measurements that determine the location of the WD 22. The grouping of WDs 22 may also be based on pathloss measurements made by the WD 22 and reported directly or indirectly to the network node 16. The grouping and setting of the thresholds may also take the power class reported by the WDs 22 into account.

Embodiment 2

Figure 13:
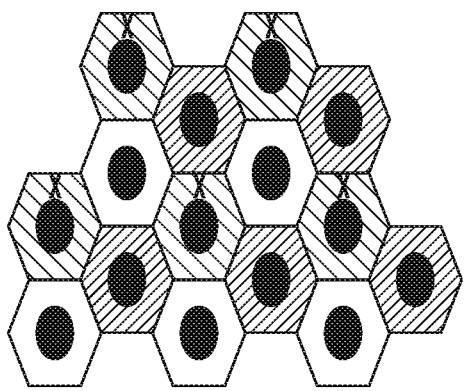
FIG. 13 illustrates fractional reuse among cells using 4 different frequencies and two ED thresholds.

In this embodiment, WDs 22 are grouped into sets within a cluster containing multiple cells. A non-limiting example of some embodiments is shown in FIG. 13 where four sets of WDs 22 are created within a cluster of 3 cells. One set contains the WDs 22 that have high SINR within each cell correlating to a lower distance between the WD 22 and the base station, if all cells were to transmit simultaneously. The WDs 22 in each of the three cells in the cluster that would have lower SINR under these conditions, correlating to a greater distance between the WD 22 and the base station, are assigned to a separate set each. Thus, the cluster of three cells has four sets of WDs 22. Each set is then assigned a different carrier frequency.

Embodiment 3

This embodiment is similar to the previous two embodiments, except that the non-overlapping frequency resources assigned to each set of WDs 22 can be partial frequency resources within a carrier rather than all the frequency resources for a particular carrier frequency.

Embodiment 3a

Similarly, for different WDs 22 supporting different sub-carrier spacing (SCS) (e.g., 60 kHz) indicated by WD 22 capability signaling could be used to group different WDs 22 together.

Embodiment 4

Figure 14:
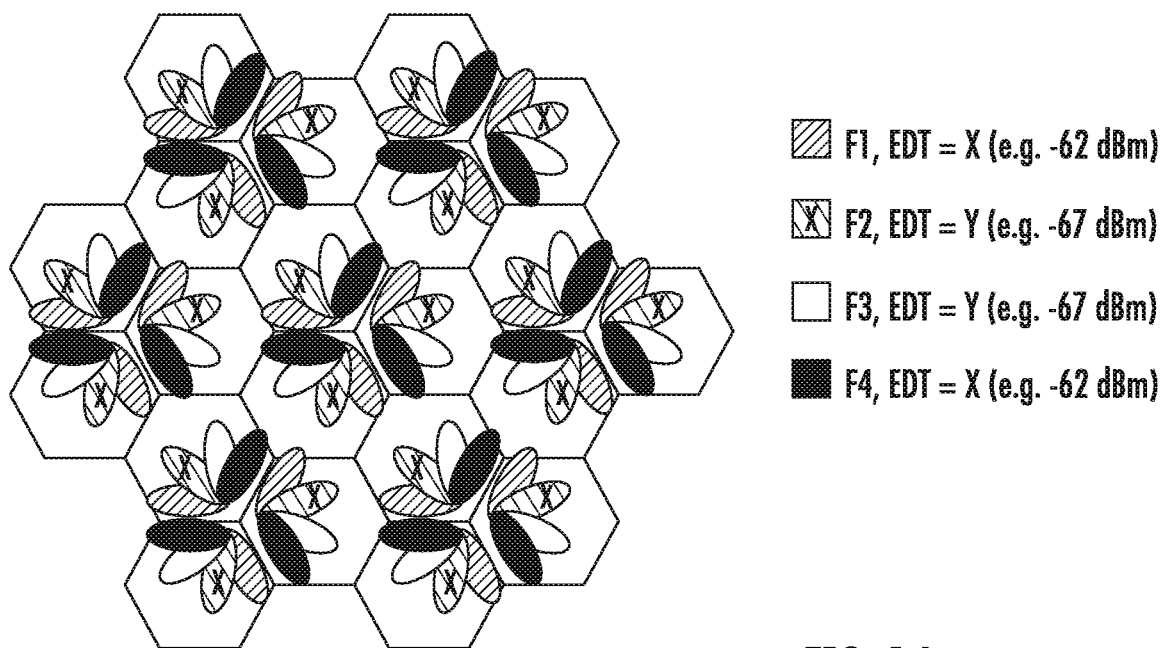
FIG. 14 illustrates fractional reuse distributed over multiple beams.

In this embodiment, WDs 22 in each cell are grouped into sets depending on the spatial beam that is used to transmit to the WD 22. The sets are then assigned mutually exclusive non-overlapping frequency resources with the resources being a carrier frequency or partial frequency resources within a carrier frequency. An example is shown in FIG. 14. The WDs 22 can also be grouped into sets considering beams in a cluster of cells as was described with reference to Embodiment 2 above.

For stationary cell deployments, such as those in an arena or sporting event or concert, WDs 22 can be grouped based upon the layout of the expected WDs 22. Some areas provide line of sight (LOS) scenarios. However, due to construction of the arena, there could be an obstruction, and this can be considered in the grouping decisions. Another aspect that may be considered is the angle in which WDs 22 are situated based upon seating. For WDs 22 at different angles, two or more spatial beams may be generated to accommodate different down tilts and the downward tilt for the beam may be used in grouping decisions.

Embodiment 5

In this embodiment, WDs 22 are grouped into sets as in previous embodiments. However, each set is assigned a non-overlapping resource in time with all sets being free to use all the available frequency resources. The resources in time may be slots in a frame structure. This embodiment also assumes that the frame structure and slot timing between all the cells in the network is aligned so that slot X transmitted from one cell 18 overlaps with slot X transmitted from a neighboring cell 18 (allowing of course for tolerances due to implementation, propagation delays, etc.)

Embodiment 6

In this embodiment, the energy detection threshold for a particular set of WDs 22 in a particular time, frequency or spatial resource may be based at least in part on whether another network of the same technology or a different technology (e.g., Wi-Fi) is using the same resources. As a non-limiting example, if it is known that a particular carrier frequency is also being used by some neighboring Wi-Fi devices, the energy detection threshold used may be lowered further beyond that determined using the other criteria listed in the embodiments above.

Embodiment 7

For devices that support different radio access technologies (RATs), the grouping of WDs 22 may be performed separately for each technology. Also, different ED thresholds can be applied depending on the particular RAT.

Embodiment 8

Previous embodiments have discussed using the SINR for grouping of WDs 22. This embodiment addresses specific SINR computation approaches that allow the setting of energy detection thresholds appropriately based at least in part on the presence of interfering devices that belong to other networks using the same or different technologies.

In one exemplary embodiment, RSSI measurements are made at the receiving device (network node 16 or WD 22) over a period of time when the transmitting device (network node 16 or WD 22) is not transmitting. The highest recorded RSSI value then provides a measure of the highest interference and noise (I+N) likely to be experienced at the receiver. This combined with a measurement of the received signal strength for the signals (S) from the transmitting device provides an estimate of the minimum SINR (S/I+N) that the receiver is likely to experience. WDs 22 can then be grouped based on this estimate. It should be noted that the measured RSSI values would include interference from all devices including those from other networks using the same or different technologies.

Embodiment 9

In this embodiment, variations of SINR within a single transmission are used to determine whether other devices, e.g., WDs 22, begin their transmissions after the reception of the current transmission has started. This could indicate that the threshold used by the other device is high enough to ignore the energy detected from the transmitter for the transmission currently being received by the device. This information can be used by the device and can also be reported to the transmitter.

If there is a significant enough increase in the interference to cause reception failures after the channel occupancy has been started by the transmitter, such information may be used by the transmitter to compensate, for example, with a lower coding rate or increased transmission power. If such measures are not enough to compensate for the increased interference and the increased interference occurs often enough to cause significant degradation, the transmitter and receiver may shift to another carrier.

Embodiment 10

In this embodiment, the energy detection threshold used for certain resources by a network node 16 or a WD 22 may depend on the SSB configuration across those resources. The SSB configuration may be controlled by a network node 16 or supervising device, e.g., base station, SON, O&M, a coordinating or controlling network node 16.

The WD 22 may determine SSB configurations and determines the ED threshold to be used on a set of resources.

In some cases, the WD 22 may use different ED thresholds on different resources, for example, due to the presence of another network on one set of resources, but not on the other. The WD 22 may do this by determining the SSB configuration and determining:

a first set of time and/or frequency resources comprising one, some, or all SSBs, wherein one or some SSBs as well as the number of such SSBs may be selected by the WD 22 or configured by a network node 16 (e.g., K best SSBs seen by the WD 22 or set of SSB configured by network node 16); and/or at least one second set of time and/or frequency resources non-overlapping with the first set (e.g., not comprising any SSB or not comprising the SSBs of interest).

The WD 22 then associates a first ED configuration with the first set and a second ED configuration with the second configuration. One or both of the ED configurations may be pre-defined, configured, or autonomously determined by the WD 22 based on a rule. In one example, a higher ED threshold may be configured for the first set and a lower ED threshold may be configured for the second set.

Embodiment 11

According to yet another embodiment, the ED threshold used by a WD 22 for applying the LBT to access the channel is adapted based on one or more of the number of carriers on which the devices is configured to transmit, the position of these carriers in frequency and whether the transmissions of the carriers overlap or not in time. The device such as the WD 22 can be configured to transmit on one or multiple carriers with at least one of the carriers on unlicensed band. The adaptation of the ED based on number of carriers is shown as an example in Table 1 below.

TABLE 1

| ED threshold adaptation based on number of carriers to transmit | |
| --- | --- |
| Number of configured carriers for transmission (N) | ED threshold (H) for each carrier on unlicensed band |
| 1 | $H_1$ |
| 2 | $H_1$ |
| ... | ... |
| K | $H_K$ |

In one specific example, the ED threshold can be increased with the number of configured carriers, e.g., the ED threshold can be set at −72 dBm when N=1 and −69 dBm when N=2. The rationale for allowing a more aggressive ED threshold (larger ED threshold) N>1 (multicarrier) compared to N=1 (single carrier operation) is that in the former case the WD 22 will transmit on each carrier with power lower than its maximum output power (e.g. 23 dBm). Therefore, the WD 22 may not cause any significant interference towards other nodes. In another example of the adaptation, the ED threshold further depends on whether the device will transmit on all the carriers simultaneously or over partially overlapping time or over non-overlapping time.

In yet another example of the adaptation, the ED threshold further depends on whether the configured carriers are adjacent to each other or not. Or, in the latter case, the ED threshold depends on whether they are in the same band or not. For example, if the carriers are non-adjacent to each other and in the same band then the device can be configured to use more aggressive (larger) ED threshold values compared to the case in which the carriers are adjacent to each other. For example, the WD 22, when configured with 2 non-adjacent carriers for uplink transmission, can use ED threshold at −66 dBm; but when configured with 2 adjacent carriers for uplink transmission, can use ED threshold at −72 dBm. In order to meet out of band emission requirements, the WD 22 reduces its maximum output power by certain margin called maximum power reduction (MPR), or additional MPR (A-MPR). In the former case (non-adjacent carriers), the WD 22 typically applies a larger power back off (e.g., MPR=X1 dB) compared to the power back off required (e.g., MPR=X2 dB) in the latter case (adjacent carriers), where X1>X2. Therefore, on average WD 22 transmit power on each carrier in configuration with non-adjacent carriers may be lower than in configuration with adjacent carriers. Therefore, in the former case the WD 22 can use more aggressive ED threshold and may still not cause any significant interference to other devices on unlicensed band.

Embodiment 12

In this embodiment, the fractional reuse configuration may be flexible and the network (e.g., represented by an eNB, a gNB or an AP) may choose and alternate between a fractional reuse configuration, for example, as illustrated by FIG. 13 and one or more other fractional reuse configurations, for example, as illustrated by FIG. 12. Additional fractional reuse configurations which may be chosen or alternated between include a fractional reuse configuration as illustrated, for example, by FIG. 12 with the modification that in each cell the frequency resources used at the cell edge are also used in the center region of the cell (i.e., the black region), in addition to frequency resources only used in the black region. Based on FIG. 12 and using the notation of FIG. 12, this type of configuration would mean that a region outside the black region comprises F1/T1, while the black region comprises F1/F2/T2 or F1/F2/T1/T2. A similar approach can be used to modify the fractional reuse configuration illustrated by FIG. 13.

Based on FIG. 13 and using the notation of FIG. 13, this type of configuration would for example mean that in the lower left cell, the center region (i.e., the black region) would use both the frequency resource represented by the black color (and which are used in the center/black region of every cell) and the frequency resources represented by the shaded areas where in one shade only the frequency resources represented by the shade are used. Similarly, in the center/black region of the cell above the lower left cell in FIG. 13, both the frequency resource represented by the black color (and which are used in the center/black region of every cell) and the frequency resources represented by the surrounding shade are used, while in the area of the surrounding shade, only the frequency resources represented by the shade are used.

In this embodiment, the network can choose/alternate between the fractional reuse configuration based on the current situation. The "current situation" may be the situation in general (e.g., as measured on average over some time) as experienced by WDs 22 with similar conditions in the cell (e.g., in terms of channel occupancy, SINR, RSRP, RSSI, pathloss, timing advance, etc.). As one example, when the channel occupancy is low (as measured by the network such as network node 16 and/or one or more WDs 22, the network such as via network node 16 can apply a fractional reuse configuration as illustrated in FIG. 12, while when the channel occupancy is high, the network such as via network node 16 may apply a fractional reuse configuration as illustrated in FIG. 13.

This kind of scheme may be applied on a case by case basis, e.g., which frequency resources to use (or to be regarded as available for use), can be based on the current situation primarily as experienced by a certain WD 22 to be scheduled. For example, if the concerned WD 22 perceives the channel occupancy as low, the network may use (or regard as available for use) frequency resources that are also used in the cell edge region of one or more neighboring cells 18 for the UL or DL transmission which is scheduled.

The mechanisms elaborated in this embodiment may be applied (e.g., based on measurements) in a single cell or jointly in multiple, e.g., a cluster of, neighboring cells 18.

Embodiment 13

This embodiment is a variation of Embodiment 1, where the WDs 22 are not partitioned into distinct sets with associated (fixed) ED thresholds. Instead, a gradual separation (which could be seen as "generalized portioning") is used and a corresponding gradual choice of ED thresholds is employed. When scheduling a WD 22 for uplink (UL) or downlink (DL) transmission, the network such as via network node 16 may base its choice of ED threshold (and transmission resources) on the current situation for that WD 22. For example, instead of dividing the WDs 22 into WDs 22 with high or low SINR with associated respective ED thresholds, the network such as via network node 16 could use the currently experienced (or recently measured) SINR for the concerned WD 22 as the basis for selection of ED threshold and, in case of UL transmission scheduling, signal that ED threshold to the WD 22 in the scheduling message (UL grant).

According to one aspect, a network node 16 comprising processing circuitry 68 is configured to associate each of a plurality of sets of resources within a cell with a different energy detection, ED, threshold, the resources in each set of the plurality of sets of resources being at least one of time resources and frequency resources. The processing circuitry 68 is further configured to assign each set of resources of the plurality of sets of resources to a different set of a plurality of sets of wireless devices, WDs 22.

According to this aspect, in some embodiments, a first ED threshold is associated with a first set of resources of the plurality of sets of resources assigned to a first set of WDs 22 having first signal to interference plus noise ratios, SINRs, higher than a first threshold, and a second ED threshold is associated with a second set of resources of the plurality of sets of resources assigned to a second set of WDs 22 having second SINR lower than a second threshold. In some embodiments, a first ED threshold is associated with a first set of resources of the plurality of sets of resources assigned to a first set of WDs 22 being less than a first distance from the network node 16, and a second ED threshold is associated with a second set of resources of the plurality of sets of resources assigned to a second set of WDs 22 being greater than a second distance from the network node 16. In some embodiments, the first set of resources of the plurality of sets of resources is reused in adjacent cells and assigned to WDs 22 based on distance to a network node 16 serving an adjacent cell, and the second set of resources of the plurality of sets of resources are not reused in adjacent cells. In some embodiments, the first and second set of resources of the plurality of sets of resources are frequency resources within a carrier. In some embodiments, each of a plurality of ED thresholds is associated with a beam in a cluster of beams serving a sector of a cell. In some embodiments, each set of resources of the plurality of sets of resources associated with an ED threshold are a set of time resources assigned to a different set of WDs 22 and each different set of WDs 22 uses a same set of frequency resources. In some embodiments, an ED threshold associated with a set of resources of the plurality of sets of resources is based on whether resources are shared with a radio access technology different from a radio access technology of the network node 16. In some embodiments, an ED threshold for a set of resources of the plurality of sets of resources is based at least in part on a synchronization signal block, SSB, configuration across the set of resources. In some embodiments, a gradation of ED thresholds are associated with sets of WDs 22 based on a gradation of WD positions.

According to another aspect, a method in a network node 16 is provided. The method includes associating each of a plurality of sets of resources within a cell with a different energy detection, ED, threshold, the resources in each set of the plurality of sets of resources being at least one of time resources and frequency resources. The method also includes assigning each set of resources of the plurality of sets of resources to a different set of a plurality of sets of wireless devices, WDs 22.

According to this aspect, in some embodiments, a first ED threshold is associated with a first set of resources of the plurality of sets of resources assigned to a first set of WDs 22 having first signal to interference plus noise ratios, SINRs, higher than a first threshold, and a second ED threshold is associated with a second set of resources of the plurality of sets of resources assigned to a second set of WDs 22 having second SINR lower than a second threshold. In some embodiments, a first ED threshold is associated with a first set of resources of the plurality of sets of resources assigned to a first set of WDs 22 being less than a first distance from the network node 16, and a second ED threshold is associated with a second set of resources of the plurality of sets of resources assigned to a second set of WDs 22 being greater than a second distance from the network node 16. In some embodiments, the first set of resources of the plurality of sets of resources are reused in adjacent cells and assigned to WDs 22 based on distance to a network node 16 serving an adjacent cell, and the second set of resources of the plurality of sets of resources are not reused in adjacent cells. In some embodiments, the first and second set of resources of the plurality of sets of resources are frequency resources within a carrier. In some embodiments, each of a plurality of ED thresholds is associated with a beam in a cluster of beams serving a sector of a cell. In some embodiments, each set of resources of the plurality of sets of resources associated with an ED threshold are a set of time resources assigned to a different set of WDs 22 and each different set of WDs 22 uses a same set of frequency resources. In some embodiments, an ED threshold associated with a set of resources of the plurality of sets of resources is based on whether resources are shared with a radio access technology different from a radio access technology of the network node 16. In some embodiments, an ED threshold for a set of resources of the plurality of sets of resources is based at least in part on a synchronization signal block, SSB, configuration across the set of resources. In some embodiments, a gradation of ED thresholds are associated with sets of WDs 22 based on a gradation of WD positions.

According to yet another aspect, a WD includes processing circuitry 84 configured to associate each of a plurality of sets of resources with a different energy detection, ED, threshold, the resources in each set of the plurality of sets of resources being at least one of time resources and frequency resources.

According to this aspect, in some embodiments, a first ED threshold is associated with a first set of resources of the plurality of sets of resources assigned to a first set of WDs 22 having first signal to interference plus noise ratios, SINRs, higher than a first threshold, and a second ED threshold is associated with a second set of resources of the plurality of sets of resources assigned to a second set of WDs 22 having second SINR lower than a second threshold. In some embodiments, a first ED threshold is associated with a first set of resources of the plurality of sets of resources assigned to a first set of WDs 22 being less than a first distance from a network node 16, and a second ED threshold is associated with a second set of resources of the plurality of sets of resources assigned to a second set of WDs 22 being greater than a second distance from the network node 16. In some embodiments, the first set of resources of the plurality of sets of resources is reused in adjacent cells and assigned to WDs 22 based on distance to a network node 16 serving an adjacent cell, and the second set of resources of the plurality of sets of resources are not reused in adjacent cells. In some embodiments, the first and second set of resources of the plurality of sets of resources are frequency resources within a carrier. In some embodiments, each of a plurality of ED thresholds is associated with a beam in a cluster of beams serving a sector of a cell. In some embodiments, each set of resources of the plurality of sets of resources associated with an ED threshold are a set of time resources assigned to a different set of WDs 22 and each different set of WDs 22 uses a same set of frequency resources. In some embodiments, an ED threshold associated with a set of resources of the plurality of sets of resources is based on whether resources are shared with a radio access technology different from a radio access technology of a network node 16. In some embodiments, an ED threshold for a set of resources of the plurality of sets of resources is based at least in part on a synchronization signal block, SSB, configuration across the set of resources. In some embodiments, a gradation of ED thresholds are associated with sets of WDs 22 based on a gradation of WD positions.

According to yet another aspect, a method implemented in a WD is provided. The method includes associating each of a plurality of sets of resources within a cell with a different energy detection, ED, threshold, the resources in each set of the plurality of sets of resources being at least one of time resources and frequency resources.

According to this aspect, in some embodiments, a first ED threshold is associated with a first set of resources of the plurality of sets of resources assigned to a first set of WDs 22 having first signal to interference plus noise ratios, SINRs, higher than a first threshold, and a second ED threshold is associated with a second set of resources of the plurality of sets of resources assigned to a second set of WDs 22 having second SINR lower than a second threshold. In some embodiments, a first ED threshold is associated with a first set of resources of the plurality of sets of resources assigned to a first set of WDs 22 being less than a first distance from a network node 16, and a second ED threshold is associated with a second set of resources of the plurality of sets of resources assigned to a second set of WDs 22 being greater than a second distance from the network node 16. In some embodiments, the first set of resources of the plurality of sets of resources is reused in adjacent cells and assigned to WDs 22 based on distance to a network node 16 serving an adjacent cell, and the second set of resources of the plurality of sets of resources are not reused in adjacent cells. In some embodiments, the first and second set of resources of the plurality of sets of resources are frequency resources within a carrier. In some embodiments, each of a plurality of ED thresholds is associated with a beam in a cluster of beams serving a sector of a cell. In some embodiments, each set of resources of the plurality of sets of resources associated with an ED threshold are a set of time resources assigned to a different set of WDs 22 and each different set of WDs 22 uses a same set of frequency resources. In some embodiments, an ED threshold associated with a set of resources of the plurality of sets of resources is based on whether resources are shared with a radio access technology different from a radio access technology of a network node 16. In some embodiments, an ED threshold for a set of resources of the plurality of sets of resources is based at least in part on a synchronization signal block, SSB, configuration across the set of resources. In some embodiments, a gradation of ED thresholds are associated with sets of WDs 22 based on a gradation of WD positions.

According to one aspect, a network node 16 has processing circuitry 68 configured to associate each of a plurality of sets of time and/or frequency resources with a different energy detection threshold, and assign each of a plurality of the sets of time and/or frequency resources to a different WD 22 or set of WDs 22 22.

According to this aspect, in some embodiments, the assigning is based on one or more of the following criteria: pathloss measurements, link quality measurements, channel occupancy measurements, a rate of transmission failure and resource use by other networks. In some embodiments, the sets of time and/or frequency resources are obtained from a partitioning of the time and/or frequency resources by the network node 16 and/or the wireless device 22. In some embodiments, the network node 16 and/or radio interface 62 and/or processing circuitry 68 are further configured to adapt a scheduling of transmissions and/or power control based on energy detection thresholds associated with each set of time and/or frequency resources. In some embodiments, the network node 16 and/or radio interface 62 and/or processing circuitry 68 are further configured to group wireless devices 22 in a cell into at least two sets based at least in part on a measure indicative of distance of a WD 22 to the network node, wherein each group is assigned a mutually exclusive set of carrier frequencies.

According to another aspect, a method implemented in a network node 16 includes associating each of a plurality of sets of time and/or frequency resources with a different energy detection threshold, and assigning each of a plurality of the sets of time and/or frequency resources to a different wireless device 22 or set of wireless devices 22.

According to this aspect, in some embodiments, the assigning is based on one or more of the following criteria: pathloss measurements, link quality measurements, channel occupancy measurements, a rate of transmission failure and resource use by other networks. In some embodiments, the sets of time and/or frequency resources are obtained from a partitioning of the time and/or frequency resources by the network node 16 and/or the wireless device 22. In some embodiments, the network node 16 and/or radio interface 62 and/or processing circuitry 68 are further configured to adapt a scheduling of transmissions and/or power control based on energy detection thresholds associated with each set of time and/or frequency resources. In some embodiments, the network node 16 and/or radio interface 62 and/or processing circuitry 68 are further configured to group wireless devices in a cell into at least two sets based at least in part on a measure indicative of distance of a WD 22 to the network node, wherein each group is assigned a mutually exclusive set of carrier frequencies.

According to yet another aspect, a WD 22 has processing circuitry configured to determine a synchronization signal block (SSB) configuration and determine an energy detection (ED) threshold to be used for each of plurality of sets of time and/or frequency resources based at least in part on the SSB configuration. According to this aspect, an ED threshold is based at least in part on a number of carriers on which the WD 22 is configured to transmit, positions of such carriers in frequency and whether transmissions of the carriers overlap.

According to another aspect, a method implemented in a wireless device (WD) 22 includes determining a synchronization signal block (SSB) configuration and determining an energy detection (ED) threshold to be used for each of plurality of sets of time and/or frequency resources based at least in part on the SSB configuration. According to this aspect, an ED threshold is based at least in part on a number of carriers on which the WD 22 is configured to transmit, positions of such carriers in frequency and whether transmissions of the carriers overlap.

Some embodiments include:

Embodiment A1. A network node configured to communicate with a wireless device (WD), the network node configured to, and/or comprising a radio interface and/or comprising processing circuitry configured to:

associate each of a plurality of sets of time and/or frequency resources with a different energy detection threshold; and assign each of a plurality of the sets of time and/or frequency resources to a different wireless device or set of wireless devices.

Embodiment A2. The network node of Embodiment A1, wherein the assigning is based on one or more of the following criteria: pathloss measurements, link quality measurements, channel occupancy measurements, a rate of transmission failure and resource use by other networks.

Embodiment A3A. The network node of Embodiment A1, wherein the sets of time and/or frequency resources are obtained from a partitioning of the time and/or frequency resources by the network node and/or the wireless device.

Embodiment A3B. The network node of Embodiment A1, wherein the network node and/or radio interface and/or processing circuitry are further configured to adapt a scheduling of transmissions and/or power control based on energy detection thresholds associated with each set of time and/or frequency resources.

Embodiment A4. The network node of any of Embodiments A1-A4, wherein the network node and/or radio interface and/or processing circuitry are further configured to group wireless devices in a cell into at least two sets based at least in part on a measure indicative of distance of a WD to the network node, wherein each group is assigned a mutually exclusive set of carrier frequencies.

Embodiment B1. A method implemented in a network node, the method comprising:
associating each of a plurality of sets of time and/or frequency resources with a different energy detection threshold; and
assigning each of a plurality of the sets of time and/or frequency resources to a different wireless device or set of wireless devices.

Embodiment B2. The method of Embodiment B1, wherein the assigning is based on one or more of the following criteria: pathloss measurements, link quality measurements, channel occupancy measurements, a rate of transmission failure and resource use by other networks.

Embodiment B3A. The method of Embodiment B1, wherein the sets of time and/or frequency resources are obtained from a partitioning of the time and/or frequency resources by the network node and/or the wireless device.

Embodiment B3B. The method of Embodiment B1, wherein the network node and/or radio interface and/or processing circuitry are further configured to adapt a scheduling of transmissions and/or power control based on energy detection thresholds associated with each set of time and/or frequency resources.

Embodiment B4. The method of any of Embodiments B1-B4, wherein the network node and/or radio interface and/or processing circuitry are further configured to group wireless devices in a cell into at least two sets based at least in part on a measure indicative of distance of a WD to the network node, wherein each group is assigned a mutually exclusive set of carrier frequencies.

Embodiment C1. A wireless device (WD) configured to communicate with a network node, the WD configured to, and/or comprising a radio interface and/or processing circuitry configured to:
determine a synchronization signal block (SSB) configuration; and
determine an energy detection (ED) threshold to be used for each of plurality of sets of time and/or frequency resources based at least in part on the SSB configuration.

Embodiment C2. The WD of Embodiment C1, wherein an ED threshold is based at least in part on a number of carriers on which the WD is configured to transmit, positions of such carriers in frequency and whether transmissions of the carriers overlap.

Embodiment D1. A method implemented in a wireless device (WD), the method comprising:
determining a synchronization signal block (SSB) configuration; and
determining an energy detection (ED) threshold to be used for each of plurality of sets of time and/or frequency resources based at least in part on the SSB configuration.

Embodiment D2. The method of Embodiment D1, wherein an ED threshold is based at least in part on a number of carriers on which the WD is configured to transmit, positions of such carriers in frequency and whether transmissions of the carriers overlap.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node, the method comprising:
   associating each of a plurality of sets of resources within a cell with a different energy detection (ED) threshold, the resources in each set of the plurality of sets of resources being at least one of time resources and frequency resources with different energy detection thresholds; and
   assigning each set of resources of the plurality of sets of resources to a different set of a plurality of sets of wireless devices (WDs), wherein each set of resources of the plurality of sets of resources associated with an ED threshold are a set of time resources assigned to a different set of WDs and each different set of WDs uses a same set of frequency resources, and wherein the network node alternates between fractional reuse configuration based on conditions experienced by the plurality of sets of WDs.

2. The method of claim 1, wherein a first ED threshold is associated with a first set of resources of the plurality of sets of resources assigned to a first set of WDs having first signal to interference plus noise ratios (SINRs) higher than a first threshold, and a second ED threshold is associated with a second set of resources of the plurality of sets of resources assigned to a second set of WDs having second SINR lower than a second threshold.

3. The method of claim 1, wherein a first ED threshold is associated with a first set of resources of the plurality of sets of resources assigned to a first set of WDs being less than a first distance from the network node, and a second ED threshold is associated with a second set of resources of the plurality of sets of resources assigned to a second set of WDs being greater than a second distance from the network node.

4. The method of claim 3, wherein the first set of resources of the plurality of sets of resources are reused in adjacent cells and assigned to WDs based on distance to a network node serving an adjacent cell, and the second set of resources of the plurality of sets of resources are not reused in adjacent cells.

5. The method of claim 2, wherein the first and second set of resources of the plurality of sets of resources are frequency resources within a carrier.

6. The method of claim 1, wherein each of a plurality of ED thresholds is associated with a beam in a cluster of beams serving a sector of a cell.

7. The method of claim 1, wherein an ED threshold associated with a set of resources of the plurality of sets of resources is based on whether resources are shared with a radio access technology different from a radio access technology of the network node.

8. The method of claim 1, wherein an ED threshold for a set of resources of the plurality of sets of resources is based at least in part on a synchronization signal block (SSB) configuration across the set of resources.

9. A wireless device (WD) comprising processing circuitry configured to:
   associate each of a plurality of sets of resources with a different energy detection (ED) threshold, the resources in each set of the plurality of sets of resources being at least one of time resources and frequency resources with different energy detection thresholds, wherein each set of resources of the plurality of sets of resources associated with an ED threshold are a set of time resources assigned to a different set of WDs and each different set of WDs uses a same set of frequency resources, and wherein the ED threshold used by the WD for applying a listen-before-talk (LBT) to access a channel that is adapted based on one or more of number of carriers on which the WD is configured to transmit, position of the one or more of number of carriers in frequency and whether the transmissions of the carriers overlap or not in time.

10. A method implemented in a wireless device (WD), the method comprising:
   associating each of a plurality of sets of resources within a cell with a different energy detection (ED) threshold, the resources in each set of the plurality of sets of resources being at least one of time resources and frequency resources with different energy detection thresholds, wherein each set of resources of the plurality of sets of resources associated with an ED threshold are a set of time resources assigned to a different set of WDs and each different set of WDs uses a same set of frequency resources, and wherein the ED threshold used by the WD for applying a listen-before-talk (LBT) to access a channel that is adapted based on one or more of number of carriers on which the WD is configured to transmit, position of the one or more of number of carriers in frequency and whether the transmissions of the carriers overlap or not in time.

11. The method of claim 10, wherein a first ED threshold is associated with a first set of resources of the plurality of sets of resources assigned to a first set of WDs having first signal to interference plus noise ratios (SINRs) higher than a first threshold, and a second ED threshold is associated with a second set of resources of the plurality of sets of resources assigned to a second set of WDs having second SINR lower than a second threshold.

12. The method of claim 11, wherein the first and second set of resources of the plurality of sets of resources are frequency resources within a carrier.

13. The method of claim 10, wherein a first ED threshold is associated with a first set of resources of the plurality of sets of resources assigned to a first set of WDs being less than a first distance from a network node, and a second ED threshold is associated with a second set of resources of the plurality of sets of resources assigned to a second set of WDs being greater than a second distance from the network node.

14. The method of claim 13, wherein the first set of resources of the plurality of sets of resources are reused in adjacent cells and assigned to WDs based on distance to a network node serving an adjacent cell, and the second set of resources of the plurality of sets of resources are not reused in adjacent cells.

15. The method of claim 10, wherein each of a plurality of ED thresholds is associated with a beam in a cluster of beams serving a sector of a cell.

16. The method of claim 10, wherein an ED threshold associated with a set of resources of the plurality of sets of resources is based on whether resources are shared with a radio access technology different from a radio access technology of a network node.

17. The method of claim 10, wherein an ED threshold for a set of resources of the plurality of sets of resources is based at least in part on a synchronization signal block (SSB) configuration across the set of resources.

18. The method of claim 10, wherein a gradation of ED thresholds are associated with sets of WDs based on a gradation of WD positions.

* * * * *